C. L. RUSSELL.
HOSE COUPLING.
APPLICATION FILED MAR. 17, 1915.
1,212,817.
Patented Jan. 16, 1917.
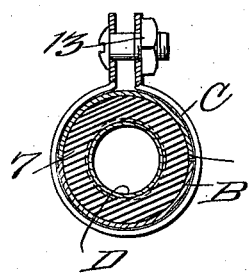
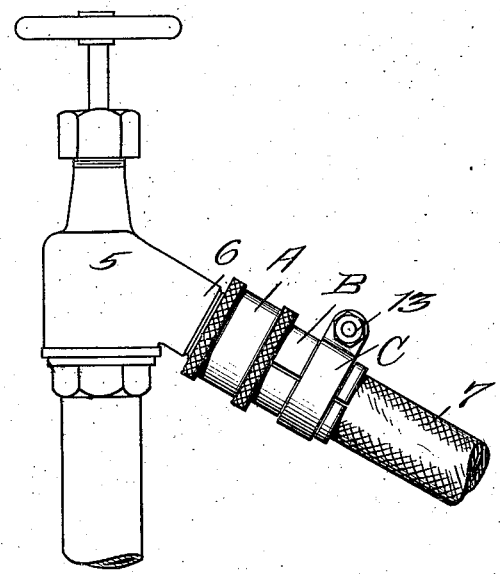
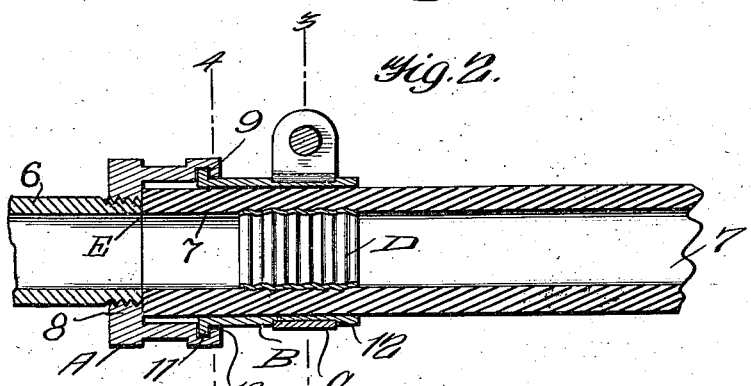
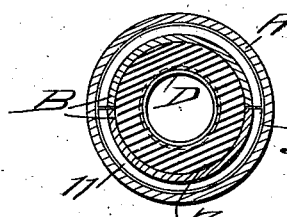
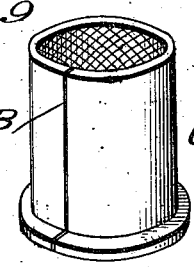
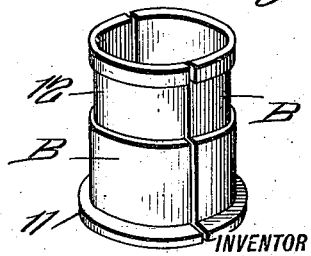
WITNESSES:
O. M. Callaghan
H. E. Beck
INVENTOR
CALVIN LEE RUSSELL,
BY Munn & Co.
ATTORNEYS

UNITED STATES PATENT OFFICE.

CALVIN LEE RUSSELL, OF TULARE, CALIFORNIA.

HOSE-COUPLING.

1,212,817.     Specification of Letters Patent.     Patented Jan. 16, 1917.

Application filed March 17, 1915. Serial No. 14,949.

*To all whom it may concern:*

Be it known that I, CALVIN LEE RUSSELL, a citizen of the United States, and a resident of Tulare, in the county of Tulare and State of California, have invented an Improvement in Hose-Couplings, of which the following is a specification.

This invention relates to an improvement in hose couplings and more particularly to an improved female coupling member.

One of the principal objects of the invention is to provide an improved hose coupling member which may be used in making a fluid tight joint between hose or other tubular sections, or between a hydrant and hose, and in such manner as to eliminate the use or necessity of any washers or gaskets.

Another object of the invention is to provide a coupling member so constructed as to bring the end of the hose section to which it is connected into play against the opposite coupling member in such manner as to tightly engage the same after the fashion of a washer or gasket, whereby to provide a fluid tight joint or connection.

A further object is to provide a device of the class described, which will be extremely simple, durable, efficient in operation, and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a view in elevation showing the manner of connecting a hose section, equipped with my improved coupling member, to a hydrant. Fig. 2 represents a view in section taken centrally and longitudinally through a hose section and through the coupling member provided thereon. Fig. 3 represents a view in section taken transversely on the plane indicated by the line 3—3 of Fig. 2. Fig. 4 represents a view in section taken transversely on the plane indicated by the line 4—4 of Fig. 2. Fig. 5 represents a view in perspective of the semi-tubular sleeve sections, showing them removed from the coupling member. Fig. 6 represents a view in perspective of a modified form of sleeve.

Referring more particularly to the drawing, I have shown at 5 in Fig. 1, a type of hydrant, providing a male coupling member 6 of usual type. The device is shown as being connected to this coupling member 6, although it will be understood that it is capable and is designed to be used with male coupling members carried by hose or tube sections, water plugs, and other such devices, the hydrant being used merely as a convenient manner of illustrating the operation of the device.

The female coupling member is adapted for use particularly with a flexible hose, a section of which is indicated at 7. The coupling includes a female coupling member A, a sleeve section B, a clamp C, and a tube or ferrule D. The member A is in the form of a sleeve or collar having an inwardly extending threaded annular flange 8 provided at what may be termed its outer end. The inner or opposite end of member A is provided with an annular internal groove 9. This groove occurs a distance inwardly from the inner end of member A, and defines an annular shoulder 10 at said inner end.

As indicated in Fig. 2, the female member A in being connected with the hose section, is slipped over the end of the section in the manner shown. The internal diameter of the flange 8 is greater than the internal diameter of the hose section, so that the end of the hose will form a shoulder or abutment indicated at E, at the inner end of the threaded bore of the flange.

The sleeve section B may be formed of a pair of members each semi-tubular in formation, and at its inner end provided with an annular outwardly extending flange 11. Near its outer end each sleeve member may, if desired, be externally and annularly grooved or recessed as at 12. The portion B may, if desired, be in the form of a split sleeve rather than being formed of separate semi-tubular sections, as shown at Fig. 6, and may be corrugated or suitably milled on its inner surface to make it cling tightly to the hose.

The tube or ferrule D, is adapted to be disposed within the hose section and to be adjusted or moved to the required position therein. This tube or ferrule is preferably annularly corrugated as indicated in Fig. 2. It may, however, in lieu of the corrugations be provided on its outer surface with burs, or, if desired, it may be suitably milled. Some suitable means may be provided on the tube at any rate for biting into the hose for preventing accidental movement of the tube or hose relatively to each other when the coupler is in place. Of course the tube may be smooth, if such construction is desired.

In assembling the device, the tube is first inserted within the hose and then the parts A and B are connected together so that the flange 11 of part B engages within the groove 9 of part A. The hose is then inserted at the outer end of the portion B and pushed into the device until the inner end of the hose abuts against the shoulder at E. The clamp is then affixed. When the device is thus finally in place, the flange 11 extends within groove 9, and the female member A is prevented from moving longitudinally relatively to the hose section, although it may be rotated relatively thereto. Whenever it is desired to connect the hose section to a hydrant or similar device, indicated in Fig. 1, the female member A is threaded upon the male member 6, until the latter at its outer end bears or is wedged against the adjacent abutment or end E of the hose section. This hose section thus takes the place of a washer, and by tightening the member A the hose will be drawn against the male member 6 whereby an exceedingly tight joint will be provided.

From the foregoing description it will be seen that I have provided an exceedingly simple and at the same time durable and useful connection, which does away entirely with the use of any washers, and which may serve to quickly perfect water tight unions between hose sections and between a hose and hydrant or other source of water supply.

Although I have described the preferred embodiment of my invention, I may desire to make such changes in the construction, combination and arrangement of parts thereof as do not depart from the spirit of the invention and the scope of the appended claims.

I claim:—

1. The combination with a hose having a squared end, and an externally threaded coupling member having a squared end, of a collar arranged on the hose having a threaded inwardly extending flange resting against the end of the hose, said flange being of an internal diameter greater than the internal diameter of the hose at its end, a sleeve arranged on the hose, means securing the sleeve against longitudinal movement relative to the hose, and an interlocking swivel connection between the sleeve and collar, retaining the collar against longitudinal movement and allowing rotary movement thereof, whereby the squared end of the hose may be forced into engagement with the squared end of the coupling member.

2. The combination with a hose having a squared end, and an externally threaded coupling member having a squared end, of a collar arranged on the hose having a threaded inwardly extending flange resting against the end of the hose, said flange being of an internal diameter greater than the internal diameter of the hose at its end, means anchored on the hose having an interlocking swivel connection with the collar, retaining the latter against longitudinal movement and allowing rotary movement of the collar, whereby said collar may be turned upon the coupler member in order that the squared end of the hose may be forced against the squared end of the coupler member.

CALVIN LEE RUSSELL.

Witnesses:
J. R. HITCHCOCK,
W. A. HIGGINS.